Feb. 4, 1958 T. A. PALMER 2,822,032
SEAT SPRING TENSION ADJUSTER
Filed Jan. 18, 1956 4 Sheets-Sheet 1

INVENTOR
Thomas A. Palmer
BY
ATTORNEY

Feb. 4, 1958 T. A. PALMER 2,822,032
SEAT SPRING TENSION ADJUSTER
Filed Jan. 18, 1956 4 Sheets-Sheet 2

INVENTOR
Thomas A. Palmer
BY
Paul Fitzpatrick
ATTORNEY

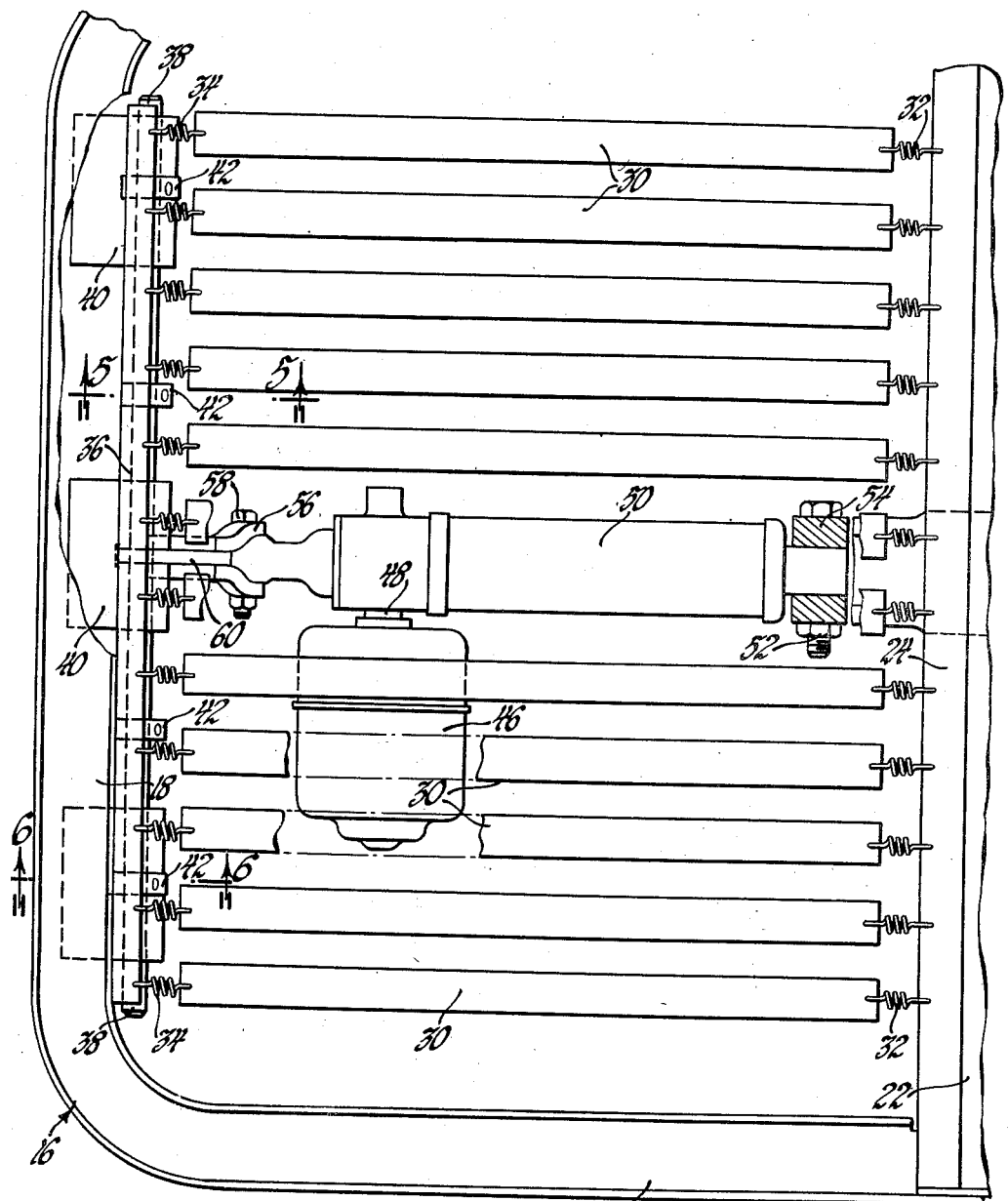

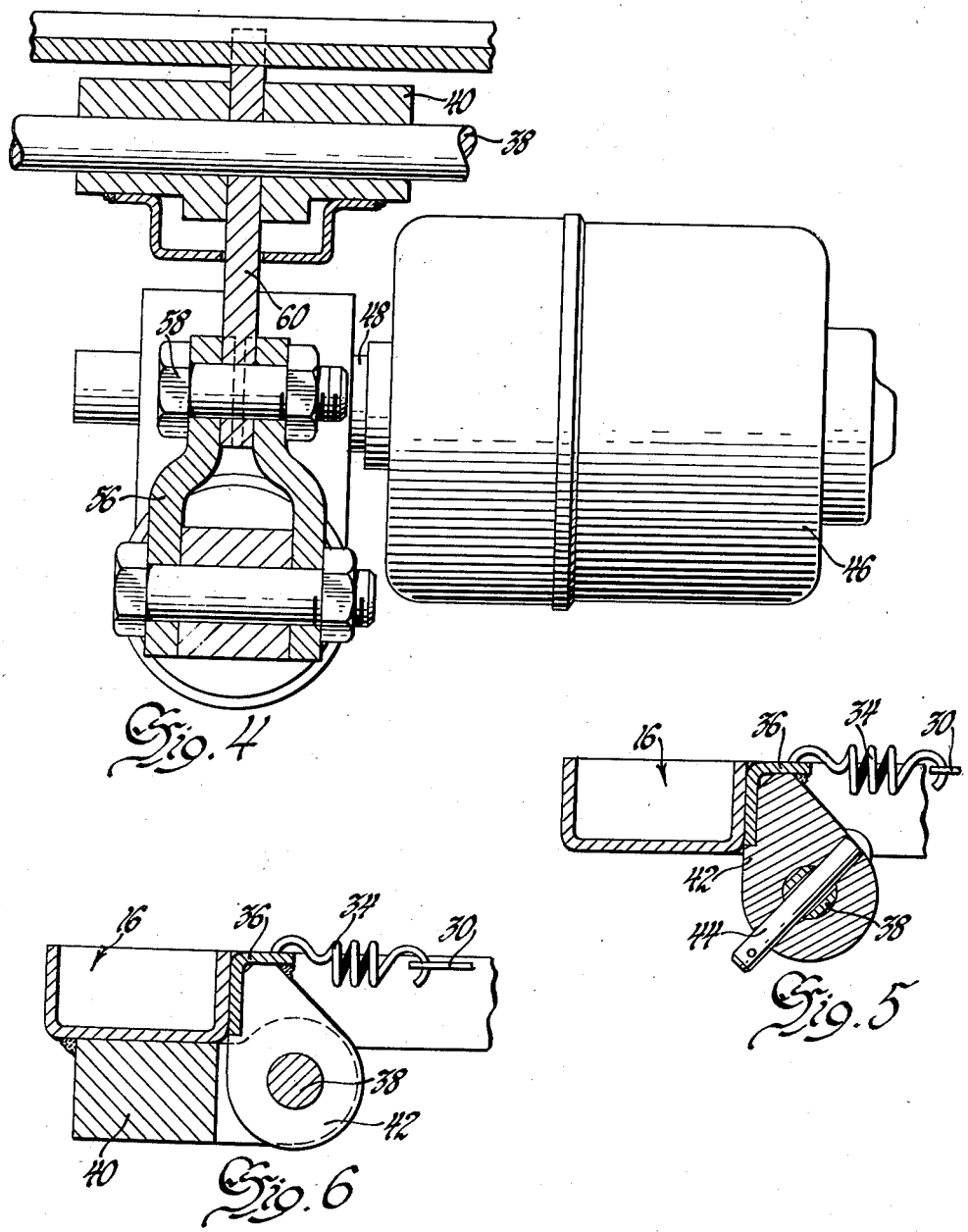

United States Patent Office 2,822,032
Patented Feb. 4, 1958

2,822,032

SEAT SPRING TENSION ADJUSTER

Thomas A. Palmer, Detroit, Mich., assignor to General Motors Corporation, Detroit, Mich., a corporation of Delaware Application January 18, 1956, Serial No. 559,870

3 Claims. (Cl. 155—179)

This invention relates to spring tension adjustment apparatus, and more particularly to spring tension adjustment apparatus in a vehicle seat.

One feature of the invention is that it provides improved spring tension adjustment apparatus; another feature of the invention is that it provides a vehicle seat having novel spring tension adjustment apparatus whereby the degree of softness of the seat may be adjusted; a further feature of the invention is that it provides seat spring tension adjustment apparatus including a plurality of parallel slat springs anchored at one end to a fixed support and connected at the other end to crank means, together with motor means for turning the crank means through an arc to adjust the tension of the spring; and yet another feature of the invention is that the slat springs are connected at one end to a transverse bar extending across one side of a vehicle seat and connected at a plurality of locations along its length to a plurality of cranks which may be turned by motor means comprising a motor driven screw jack.

Other features and advantages of the invention will be apparent from the following description and from the drawings, in which:

Fig. 3 is a fragmentary top plan view, partly in section, through the seat of Figs. 1 and 2 with the seat cushion removed;

Fig. 4 is an enlarged vertical detail section taken along the line 4—4 of Fig. 2;

Fig. 5 is a detail section taken along the line 5—5 of Fig. 3; and

Fig. 6 is a detail section taken along the line 6—6 of Fig. 3.

In automobile seat construction a seat cushion is mounted on a fixed frame and seat springs are provided beneath the cushion. Springs of various types are conventionally used, as for example, coil springs, zigzag springs, or slat springs. To insure maximum comfort for the occupant of the seat, means may be provided for adjusting the tension of the seat springs. This invention provides a simple and novel tension adjustment means particularly adapted for use with a plurality of slat springs. The springs are anchored at one end to the seat frame or to some other fixed support and at the other end they are connected to a transverse bar which extends across the front of the seat. A transverse rotatable rod extending parallel to the bar has a plurality of cranks which are connected to the bar in spaced relationship therealong and means are provided for turning the bar and cranks through an arc to adjust the tension of the springs.

Figure 1:
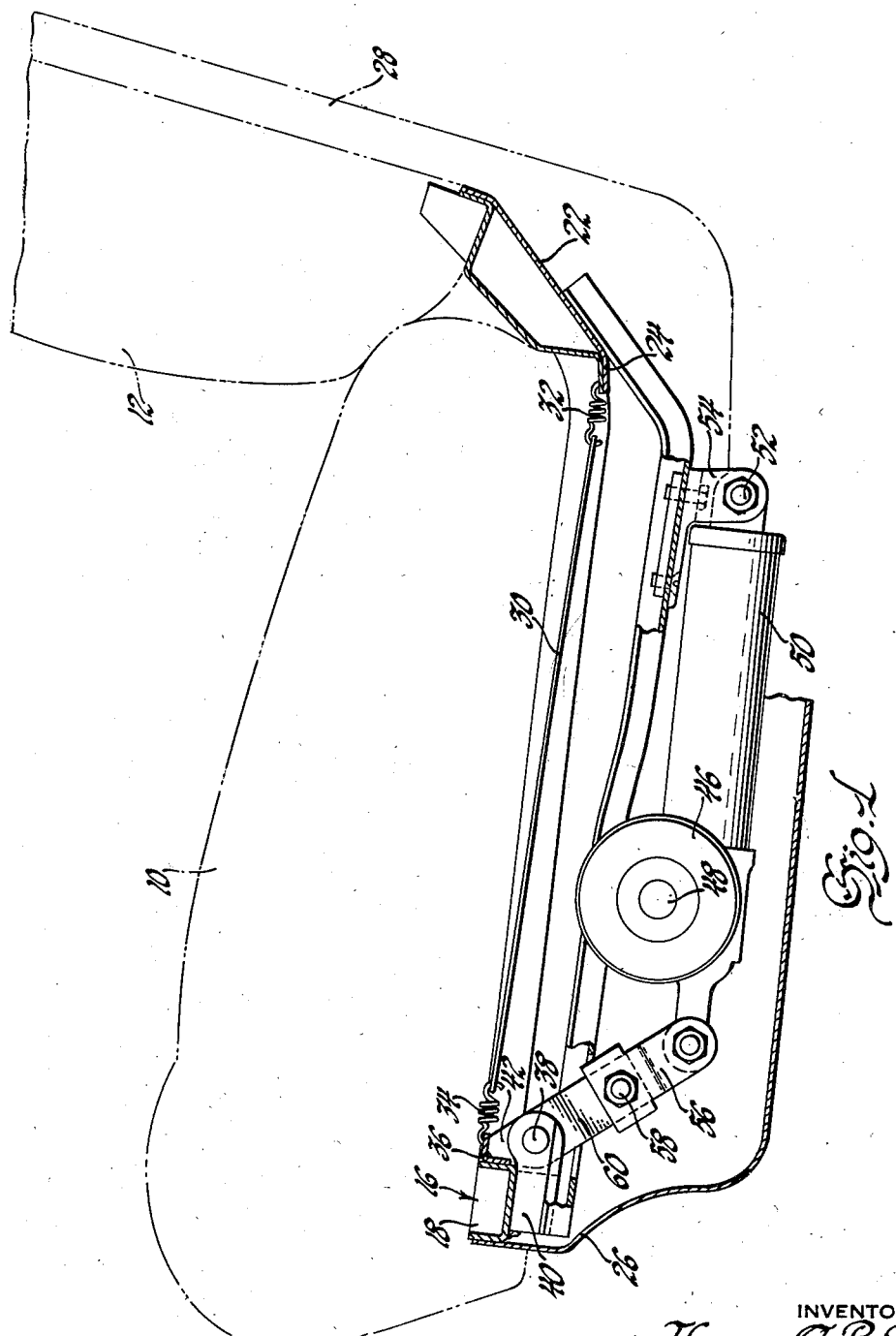
Fig. 1 is a side elevation, partly in section, of an automobile seat having the improved spring tension adjustment apparatus, the springs being drawn up tight.
Figure 2:
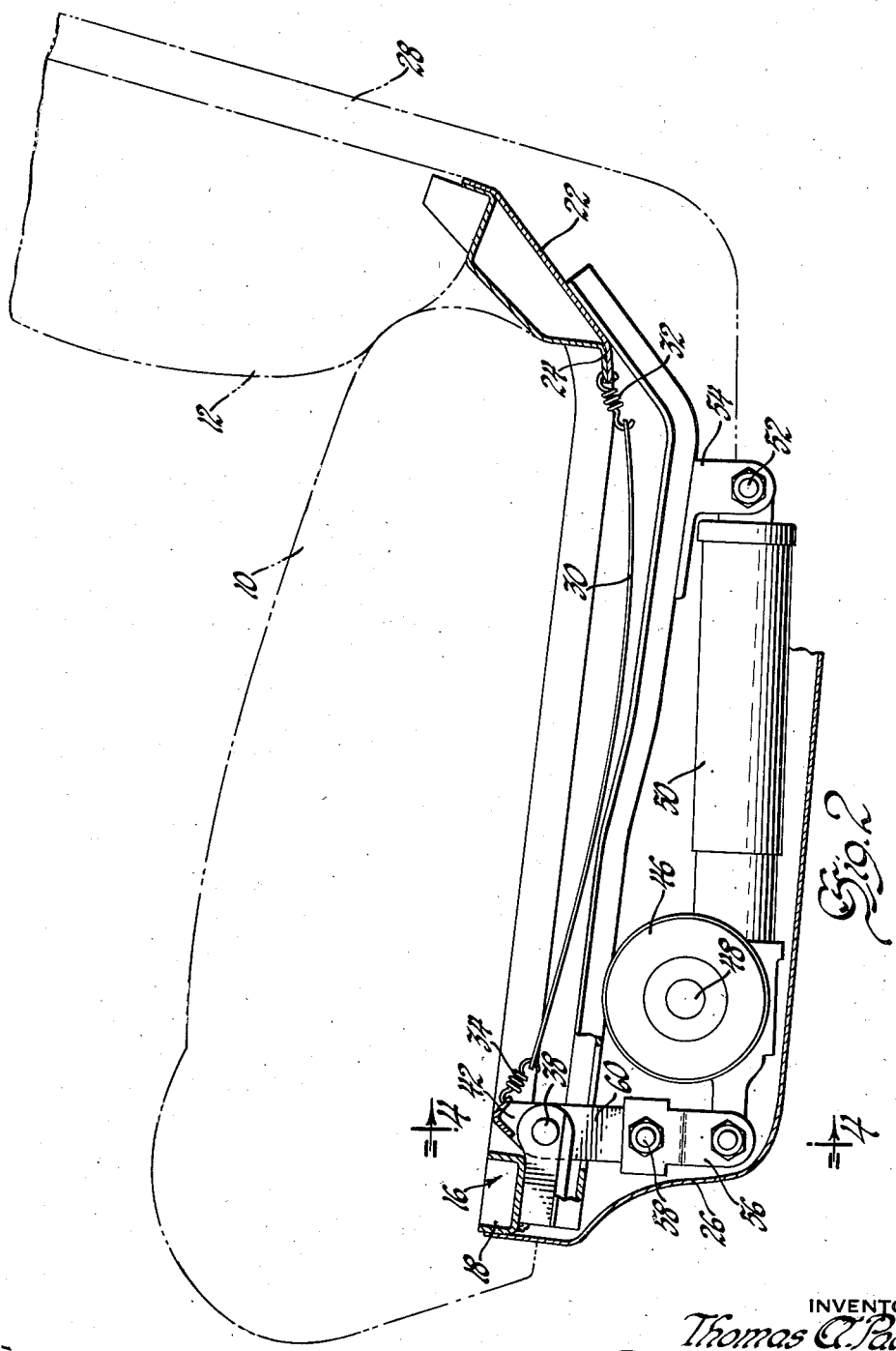
Fig. 2 is a view similar to Fig. 1 but with the tension adjustment means shown in a different condition in which the tension of the springs is less than in Fig. 1.

Referring now more particularly to the drawings, Figs. 1 and 2 show an automobile seat comprising a cushion 10 and a seat back 12. The cushion is supported in a fixed frame including a U-shaped channel member 16, which as shown best in Fig. 3, has a front transverse portion 18 extending across the front of the seat and integral opposite side portions 20 (only one being illustrated) extending along the opposite sides of the seat. At the rear the seat cushion is supported by a box member 22 having a flange 24 projecting forwardly from its lower front edge. The seat supporting frame is carried on a floor support 26 having at its back side an upwardly extending frame portion 28 for supporting the seat back 12. The interior construction of the seat cushion is not illustrated since it may be conventional, including padding carried on springs inside the cushion.

Beneath the seat cushion 10 there are a plurality of parallel slat springs 30. At its rear end, each spring is connected through the intermediary of a small coil spring 32 to the flange 24 on the rear stationary box support member 22. At the front end, each spring is connected through the intermediary of a small coil spring 34 to a transverse L-shaped bar 36 which extends across the front of the seat adjacent the inner edge of the front portion 18 of the seat supporting channel 16. Below the transverse bar there is a rod 38 which is rotatably supported in a plurality of bearings 40 welded to the underside of the seat support channel 16. A plurality of cranks or eccentrics 42 are nonrotatably mounted on the rod 38, being pinned thereto as shown at 44 in Fig. 5, and these cranks are welded or connected in any other suitable manner to the transverse bar 36 in spaced relation therealong. Figs. 5 and 6 show this arrangement in detail, the cranks being welded to the bar.

Motor means are provided for turning the cranks to adjust the tension of the slat springs 30. Beneath the seat adjacent the transverse center thereof there is a reversible electric motor 46, the output shaft 48 of which is geared to a screw jack 50. The rear end of the screw jack is pivotally connected at 52 to a bracket 54 depending from the center of the rear side of the seat frame and the front end of the screw jack is connected to a yoke 56 which is bolted at 58 to a link 60 which has its forward upper end connected to the rod 38.

In Fig. 1, the screw jack 50 is retracted so that the rod 38, cranks 42 and transverse bar 36 are rotated in a counterclockwise direction to their extreme forward position. This puts maximum tension on the slat springs 32, stretching the coil springs 33 and 34. In Fig. 2, the motor driven screw jack has been extended to rotate the shaft 38, cranks 42 and transverse bar 36 through an arc in a clockwise direction resulting in slackness in the slat springs 30 to provide a seat having a softer springing action than the seat of Fig. 1. The reversible motor 46 may be operated through any conventional switching means to provide adjustment of the spring tension between the limits shown in Figs. 1 and 2. The motor may be connected to the automobile battery in conventional manner.

While I have shown and described one embodiment of my invention, it is capable of many modifications. Changes, therefore, in the construction and arrangement may be made without departing from the spirit and scope of the invention as set forth in the appended claims.

I claim:

1. Spring tension adjustment apparatus of the character described, including: a rigid seat frame; a plurality of parallel slat springs within said frame; means fixedly anchoring one end of each spring to said frame at one side thereof; a transverse bar extending across said frame adjacent the opposite side thereof and connected to the other end of said springs; means for movably supporting said bar including at least one crank connected to said bar;

and motor means for turning said crank to adjust the tension of said springs.

2. Seat spring tension adjustment apparatus of the character described, including: a rigid peripheral seat frame; a plurality of parallel slat springs within said frame; means fixedly anchoring one end of each spring to said frame at one side thereof; a transverse bar extending across said frame adjacent the opposite side thereof and connected to the other end of said springs; means for movably supporting said bar including a plurality of cranks connected to said bar in spaced relation therealong; and motor means including a motor driven screw jack connected to said cranks for turning said bar and cranks to adjust the tension of said springs.

3. Seat spring tension adjustment apparatus of the character described, including: a rigid peripheral seat frame; a plurality of parallel slat springs within said frame; means fixedly anchoring one end of each spring to said frame at one side thereof; a transverse bar extending across said frame adjacent the opposite side thereof and connected to the other end of said springs; a transverse rod rotatably mounted on said frame adjacent said other end thereof in spaced relation to said bar, said rod having a plurality of cranks projecting therefrom and connected to said bar in spaced relationship therealong; and means for turning said rod and cranks through an arc to move said bar and adjust the tension of said spring, comprising a motor driven screw jack and link means connecting said screw jack to said rotatable rod.

References Cited in the file of this patent

UNITED STATES PATENTS

| | | |
|---|---|---|
| 876,096 | Ryan | Jan. 7, 1908 |
| 973,778 | Grotenhuis | Oct. 25, 1910 |
| 1,321,814 | Ershler | Nov. 18, 1919 |
| 2,558,288 | Backus | June 26, 1951 |
| 2,615,178 | Karg | Oct. 28, 1952 |
| 2,740,468 | Gonia et al. | Apr. 3, 1956 |

FOREIGN PATENTS

| | | |
|---|---|---|
| 190 | Great Britain | 1901 |
| 30,178 | Switzerland | Dec. 6, 1903 |
| 269,072 | Germany | Jan. 12, 1914 |